United States Patent
Lundin et al.

(10) Patent No.: US 7,680,109 B2
(45) Date of Patent: Mar. 16, 2010

(54) MOBILE MULTIPOINT SERVICE

(75) Inventors: Niklas Lundin, Gothenburg (SE);
Karl-Henrik Henriksson, Gothenburg (SE); Tobjorn Lundin, Gothenburg (SE); Lars Ekeroth, Vastra Frolunda (SE); Frank Hundscheidt, Kerkrade (NL); Lohmar Thorsten, Aachen (DE); Ralf Keller, Wurselen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1159 days.

(21) Appl. No.: 10/487,128

(22) PCT Filed: Aug. 14, 2002

(86) PCT No.: PCT/SE02/01452

§ 371 (c)(1),
(2), (4) Date: Feb. 19, 2004

(87) PCT Pub. No.: WO03/017703

PCT Pub. Date: Feb. 27, 2003

(65) Prior Publication Data

US 2004/0213179 A1    Oct. 28, 2004

(30) Foreign Application Priority Data

Aug. 21, 2001  (SE) .................... 0102778
Aug. 28, 2001  (SE) .................... 01120474

(51) Int. Cl.
*H04L 12/28* (2006.01)
(52) U.S. Cl. .................. 370/390; 370/389; 370/352; 370/348; 370/401
(58) Field of Classification Search .......... 370/390, 370/331, 328, 329, 338, 352, 389, 349
See application file for complete search history.

(56) References Cited

U.S. PATENT DOCUMENTS

2001/0017856 A1 *  8/2001  Asokan et al. ............... 370/389

(Continued)

FOREIGN PATENT DOCUMENTS

EP            1071296         7/1999

(Continued)

OTHER PUBLICATIONS

3$^{rd}$ Generation Partnership Project; Technical Specification Group Services and System Aspects; Broadcast and Multicast Services; (Release 5), 3GPP TS 22.946 v1.0.0 (Jun. 2001).

(Continued)

*Primary Examiner*—Vincent P Harper
*Assistant Examiner*—Dung Lam

(57) ABSTRACT

A packet radio data network and methods have been disclosed, the network comprising at least a gateway node (GGSN), at least one serving node (SGSN) connected to the gateway node, a plurality of radio access nodes (RAN) connected to the serving node (SGSN), the packet radio network transporting packet data from an external packet data network, comprising an Internet Service Provider (ISP), to mobile stations (MS) wirelessly attached to radio access nodes (RAN). The gateway node, subsequent to a PDP multipoint context activation procedure, establishes at least a first multicast tunnel (GTPT1 GTPT4, GTPT10 GTP35) between the gateway node and at least one serving node, the multicast tunnel carrying IP streams pertaining to at least two mobile stations belonging to a common multicast group.

14 Claims, 6 Drawing Sheets

U.S. PATENT DOCUMENTS

| | | | |
|---|---|---|---|
| 2001/0036175 A1* | 11/2001 | Hurtta | 370/352 |
| 2002/0049066 A1* | 4/2002 | Muhonen et al. | 455/503 |
| 2002/0057663 A1* | 5/2002 | Lim | 370/338 |
| 2003/0039237 A1* | 2/2003 | Forslow | 370/352 |
| 2003/0147389 A1* | 8/2003 | Zirwas | 370/390 |

FOREIGN PATENT DOCUMENTS

| | | | |
|---|---|---|---|
| EP | 1071296 A1 * | 1/2001 | |

OTHER PUBLICATIONS

3rd Generation Partnership Project; Technical Specification Group Services and System Aspects; Broadcast/Multicast Service; (Release 6), 3GPP TR 23.846 v1.0.0 (Jan. 2002), see Chapter 6.9.1, chapter 7, annex A.

* cited by examiner

| RTS10 | |
|---|---|
| GTPT | RAN |
| 1 | 1+3 |
| 2 | 1 |
| 3 | 3 |
| 4 | 1+2+3 |

Fig. 5

| RTS15 | |
|---|---|
| GTPT | RAN |
| 10 | 3 |
| 15 | 1 |
| 20 | 1+2 |
| 35 | 3 |

Fig. 6

| RTR10 | |
|---|---|
| Stream ID | M |
| 7 | 1+4 |
| 8 | 3 |
| 8L | 2 |

Fig. 7

| RTR20 | |
|---|---|
| Stream ID | M |
| 8L | 5 |

Fig. 8

| RTR30 | |
|---|---|
| Stream ID | M |
| 7 | 7 |
| 7L | 6 |
| 8L | 8 |

Fig. 9

MOBILE MULTIPOINT SERVICE

FIELD OF THE INVENTION

The present invention relates to multicast services for mobile networks. The present invention also relates to system components in mobile networks rendering such multicast services possible. More specifically the invention relates to multicasting in a GPRS network.

BACKGROUND OF THE INVENTION

Multicasting is a service that permits a source to send a message to a plurality of specific recipients. The notion multicasting typically involves that only one copy of the message will pass over any link in a network and copies of the message will be made only where paths diverge. From a network perspective, multicasting dramatically reduces overall bandwidth consumption, since data is replicated in the network at appropriate points.

With Internet Protocol IP multicast, receivers do not need to know who or where the senders are and senders do not need to know who the receivers are. Neither senders nor receivers need to care about the network topology as the network optimises delivery. The distribution of information via IP multicast is performed on the base of a hierarchical connection of the hosts, like for example a tree. Several algorithms have been proposed for building multicast distribution trees, like for example spanning trees, shared-trees, source-based trees, core-based trees. The descriptions of the corresponding algorithms can be found in "IP telephony: Packet-based multimedia communications systems" O. Hersent, D. Gurle, D. Petit, Addison-Wesley, Harlow, 2000. After the establishment of the distribution tree, the distribution of the information is done by the IP multicast routing protocols. The detailed description of the corresponding IP multicast routing protocols can be also found in the above-mentioned document.

An advantage of the IP multicast is the support of the heterogeneous receivers. Sending the different media to different multicast groups allows receivers to decide which media to receive. Similarly, if a sender layers its video or audio stream, different receivers can choose to receive different amounts of traffic and hence different qualities. To do this the sender must code the video as a base layer it means with the lowest quality that might be acceptable and a number of enhancement layers. Each enhancement layer adds more quality at the expense of more bandwidth. For video transmission, these additional layers might increase the frame rate or increase the spatial resolution of the images or both. Each layer is sent to a different multicast group and receivers can individually decide to how many layers they wish to subscribe.

Local area networks have supported multicasting for many years. For typical CSMA (Carrier Sense Multiplex Access) networks where nodes share a common communication medium, multicasting is easy to support. Ethernet for instance supports unicast addresses, multicasting addresses and the network broadcast address. A specially addressed packet can be read off the communication medium by multiple hosts.

Extending multicasting capabilities to inter-networks however led to the introduction of a router at the edge of a network in order to figure out dynamically how to forward the datagram, whereby a datagram denotes a data packet which is established on the IP layer. The way of forwarding is delivered from the address included in the header of the datagram and from the routing table, which is administrated in the router. There are a few possibilities of doing the multicast addressing. The normal way of doing multicast addressing is by using dedicated multicast addresses. These addresses denote groups rather than individual recipients (as is the case with normal IP addresses). The task of the router in this case is to encode the destination addresses and to route it according to the information from the routing table.

Multicast is a receiver-based concept, it means the receivers join a particular multicast session group by informing a corresponding multicast router and traffic is delivered to all members of that group by the network infrastructure. The transmission can be performed either from one user to many users, the so-called one-to-many multicast or many users send information to many receivers, the so-called many-to-many transmission. Within the IP multicast, the membership of a multicast session group is dynamic it means that the hosts may join and leave groups at any time.

The technical background for multicasting is covered in the following:

IP Telephony: Packet-based multimedia communications systems. Hersent, O., Gurle, D., Petit, D., Addison-Wesley, Harlow, 2000.

According to known GPRS and UMTS networks, the mobile terminated down-link traffic is routed using identities which are designed to only handle point to point traffic. In order to reach multiple end users, multiple unicast messages have to be sent.

The technical background about GPRS in GSM and UMTS is covered in the following:

3GPP TS 03.60 V7.5.0 (2001-01) 3rd Generation Partnership Project;

Technical Specification Group Services and System Aspects,

Digital cellular Telecommunications System (Phase 2+),

General Packet Radio Service (GPRS),

Service Description, Stage 2 (Release 1998).

3GPP TS 23.060 V3.6.0 (2001-01)

3rd Generation Partnership Project;

Technical Specification Group Services and System Aspects,

General Packet Radio Service (GPRS),

Service Description, Stage 2 (Release 1999).

There is currently no mechanism available for point to multipoint traffic for wireless terminals when IP addressing is not used, c.f. IP multicast.

SUMMARY OF THE INVENTION

The present invention achieves a more efficient multicast transmission in General Packet Radio Networks, more specifically those portions of the GPRS network according to 3GPP specifications that are denoted the Gn, Gp and the Iu-PS interface.

It is a first object of the invention to make it possible to introduce multicast services in mobile networks, such that resources are used efficiently. That is, transmitting information to a large group of receivers simultaneously while utilising a minimum of bandwidth.

It is another object to introduce multicast tunnels, which are easily managed especially by the serving node.

It is a further object to reduce the number of multiple multipoint GTP tunnels between the GGSN and each corresponding SGSN and the SGSN and each corresponding RAN in situations where many users are requesting multicast data simultaneously.

It is a further object to set forth a method for establishing multicast tunnels enabling combined IP stream content of multiple multicast groups.

It is a further object to set forth a method for establishing multicast tunnels enabling IP stream content related to a single multicast group.

Further advantages will appear from the following detailed description and the drawings of the invention.

BRIEF DESCRIPTION OF THE DRAWINGS

FIG. 5 is a routing table for the first embodiment, FIG. 6 is a routing table for the second embodiment, FIG. 7-9 are routing tables for the first and second embodiment.

DESCRIPTION OF PREFERRED EMBODIMENTS OF THE INVENTION

The present invention introduces a concept that allows several users to listen to multicast transmissions in a wireless network and more specifically a GPRS network. This concept comprises an application level multicast session with the following properties:

The transmission is simplex, unidirectional, sent from one source to many end users, located at one or many geographical sites. There is one source and many end users. The user must register to the service to get the information needed (e.g. decoding, ciphering key etc.) for the terminal to listen to the transmission via a new type of PDP context, which several users can share.

The user may be notified of the presence of a certain multicast transmission, either by active search for available services in a certain area, e.g. via a web page, or by getting information about the service via e.g. SMS or a push service.

First Preferred Embodiment of the Invention

Figure 1:
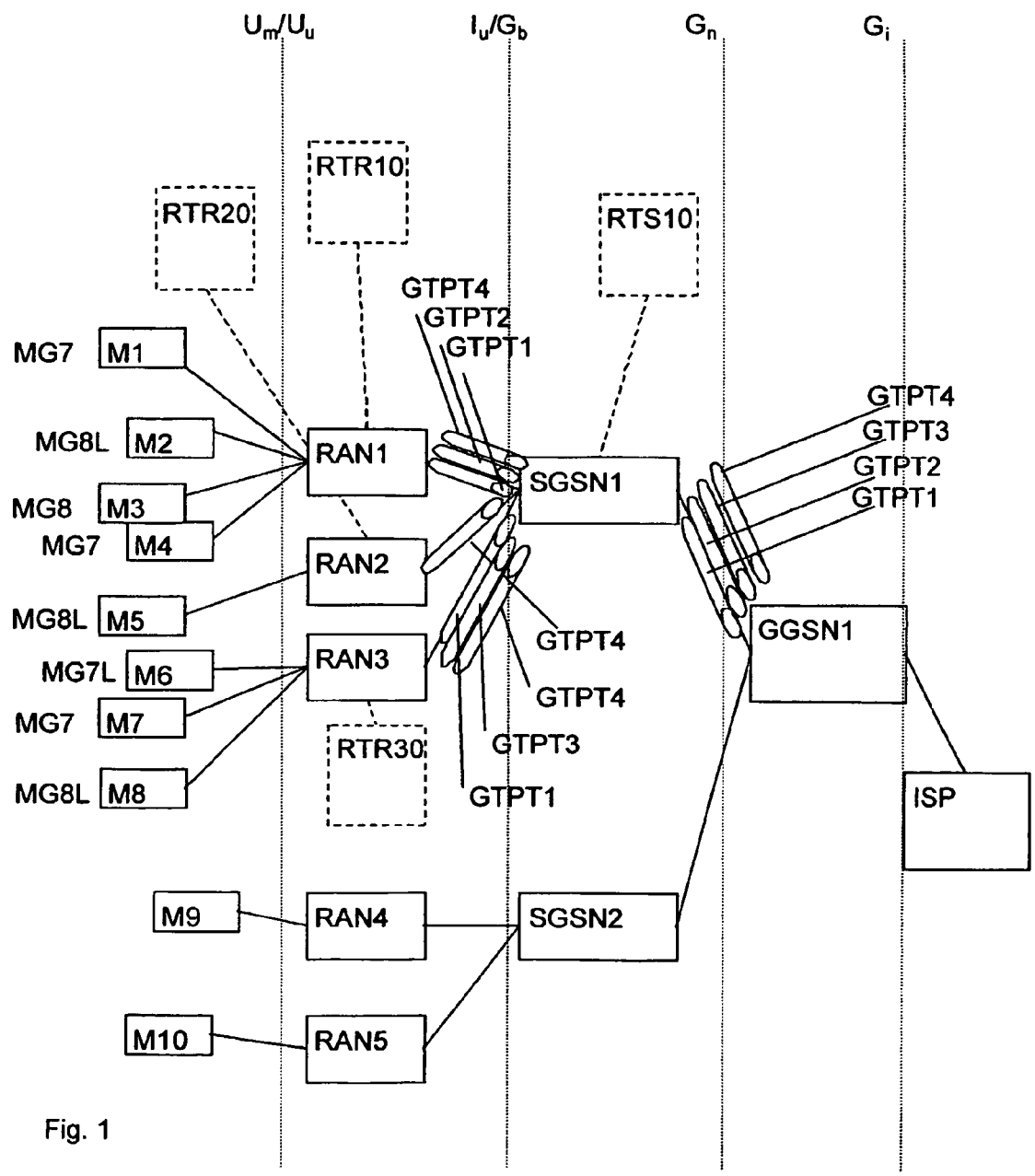
FIG. 1 shows an exemplary GPRS communication network according to a first embodiment of the invention.

In FIG. 1, an exemplary diagram relating to a GPRS network has been shown whereby the multicasting according to a first embodiment of the invention has been shown. In the given example a number of mobile stations M1-M10 are wirelessly connected to a number of base stations, also denoted radio access nodes (RAN1-RAN5). The RAN's are coupled to respective Serving GPRS Support Nodes (SGSN1, SGSN2), which then again are coupled to a Gateway GPRS Support Node (GGSN). An Internet Service Provider (ISP) is connected to the GGSN and delivers for instance various services such as streaming video and audio.

Packet streams are routed in the GGSN, SGSN1 and SGSN2 and RAN1-RAN5, by means of routing tables. An excerpt of routing tables has been shown in the present example, namely routing table RTR10 relating to RAN1, RTR20 relating to RAN2, RTR30 and RTS10 relating to SGSN1.

In the present example the mobile stations wishes to receive multicasting services of the following types: A first multicast group MG7 of a first high quality of service (QoS), a first multicast group of a lower quality of service (QoS) MG7L, a second multicast group MG8 of a first high quality of service and a second multicast group of a lower quality. All these services are rendered available by the ISP either directly to a number of GGSNs, or via IP Multicast.

It should be noted that in a real system, a higher number of mobile stations would typically be present. Moreover, many more services would be demanded and at least four QoS classes would be available. However, for illustrative purposes the above simple example has been chosen.

According to the first embodiment of the invention, the GPRS tunnel protocol (GTP) renders the multicast connectivity possible. A GTP tunnel is two-way, point to point path. By encapsulating a packet or a stream of IP packets with a tunnel specific header, data is tunnelled to a tunnel endpoint. In the following, the term multicast tunnel will be used for referring to a GTP tunnel that is adapted to carry an IP stream of multicast content, that is, content which potentially can or will be received by a plurality of end points.

Figure 3:
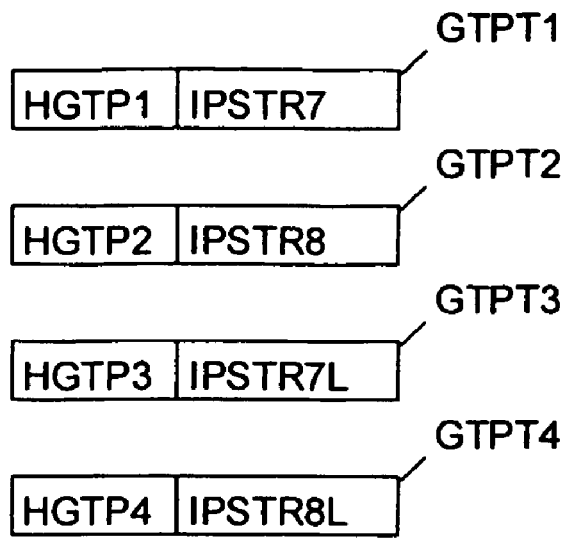
FIG. 3 shows exemplary GPRS tunnels according to the first embodiment of the invention relating to FIG. 1.

According to the first embodiment of the invention, a first multicast GTP tunnel, GTPT1, shown in FIGS. 1 and 3 is set up between GGSN1 and SGSN1 and between SGSN1 and RAN1 as well as between SGSN1 and RAN3. The multicast tunnel GTP1 carries the IP packet stream IPSTR7 from GGSN1 to SGSN1, from where it is cast to RAN1 and RAN3, respectively. For this purpose, the header HGTP1 comprises the addresses of one of the following SGSN1, RAN1 and RAN3.

In analogy with the above, tunnel GTPT2 carrying stream, IPSTR8 is transmitted to mobile station M8 being the sole member of multicast group MG8. Tunnel GTPT3 carrying IP Stream IPSTR7L is distributed to mobile station M6 and tunnel GTPT4 carrying IPSTR8L is routed to RAN1, RAN2 and RAN3 in accordance with routing table RTS10 for reaching mobile stations M2, M5 and M8.

Routing tables RTR10, RTR20 and RTR30, shown in FIGS. 7-9 secure that the various streams are provided to the respective mobile stations.

It is noted that the SGSN does not examine the content of the tunnels (packets), but that the SGSN just redirects the tunnels according to the routing table RTR10.

Hence, a PDP type multipoint service, which enables the above multicasting traffic, has been set forth.

In order to initiate the above multicast service session, the end-users initiate a PDP Context Activation with the PDP type Multipoint, the latter being the designation for the service.

Preferably, the PDP type Multipoint identity should be unique in the whole PLMN. The reason for this is that it will be possible to avoid duplicate transmissions of the same content when a terminal moves from one SGSN to another. The multipoint PDP context is activated in the respective node when the first user appears. For each consecutive new user, the context is modified, whereby the new user is added.

The functionality in the Core Network (CN) can be generalised as follows:

GGSN: The GGSN maintains a list of active SGSN's per PDP context multipoint. The GGSN can have one GTP tunnel towards each SGSN. The GGSN receives the transmission and forwards it to the SGSN's that have an active PDP context multipoint. Another solution between the GGSN and the SGSN's is to utilise IP multicast on the Gn instead of multiple GTP tunnels.

SGSN: The SGSN maintains a list of active terminals and which RAN node they are connected to. The SGSN can have one GTP tunnel towards each RAN node. The SGSN receives the transmission from the GGSN and forwards it to the relevant RAN nodes. Another solution between the SGSN and the RAN is to utilise IP multicast on the RAN instead of multiple GTP tunnels.

HLR (not shown): The PDP Context Multipoint subscription data may be present in the HLR. This data may include the following: APN, the unique identifier, encryption and decryption keys, QoS needed (bit-rate), charging info.

The PDP type multipoint service may be extended to the radio access network general functionality in the Radio Access Network (RAN). The RAN nodes should be aware of the PDP Context Multipoint to such a level that transmissions may be sent, per cell, or broadcasted, when an active user is present. It shall be possible to have one transmission per RAN cell that is received by many terminals.

Multicast Tunnel Establishment

The procedure for setting up a multicasting session, according to the first embodiment of the invention—denoted the PDP Context Multipoint Activation Procedure—shall now be dealt with in more detail by initially referring to the following example. A PDP context refers to the procedure by which a mobile station will be able to perform packet switched communication with an external packet data network, including making it possible to route data streams to appropriate nodes in the network:

User M1 in FIG. 1 starts access to multipoint service MG7 and is the first user of this service. The PDP context is activated in both an SGSN1 and GGSN. When user M9 also starts access to the same service, say from another SGSN, namely SGSN2, the same PDP context is activated in the new SGSN2, but the PDP context in the GGSN is only modified such that the multipoint traffic also is routed to the new SGSN. In this manner, the same PDP context can be active and used by many end users simultaneously.

Figure 10:
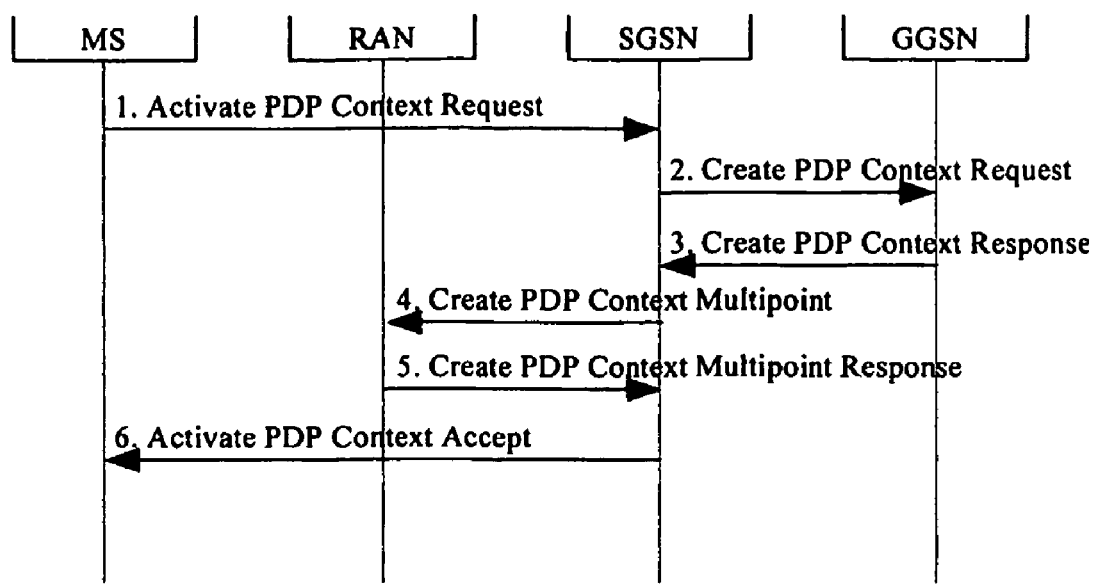
FIG. 10 is a schematic representation of a preferred procedure for activation of a PDP context multipoint session according to the embodiment of the invention, FIG. 11 relates to a multiplexed multicast tunnel establishment procedure according to the second embodiment of the invention, and FIG. 12 relates to a multiplexed multicast tunnel release procedure according to the second embodiment of the invention.

With reference to FIG. 10, the PDP Context Multipoint Activation Procedure according to the first embodiment of the invention shall be explained in more detail. The below procedure is exemplary for an UMTS access network:

1) The MS sends an Activate PDP Context Request (e.g. PDP Type=Multipoint, Access Point Name, QoS Requested) message to the SGSN. Access Point Name is a logical name referring to the external packet data network and/or to a service that the subscriber wishes to connect. QoS Requested indicates the desired QoS profile.

2) The SGSN validates the Activate PDP Context Request using PDP Type and Access Point Name provided by the MS and the PDP context subscription records. Next the SGSN checks if the requested PDP Context already is activated by another MS, if so, the SGSN adds the MS to the PDP context list and continues with step 4. Otherwise, the SGSN sends a Create PDP Context Request (e.g. PDP Type=Multipoint, Access Point Name, QoS Negotiated, unique id) message to the affected GGSN.

3) The GGSN creates a new entry in its PDP context table, if the PDP context is not already active in the GGSN (by another SGSN). The new entry allows the GGSN to route PDUs from the external PDP network to the SGSN(s), which will send the packets on to the affected RAN's. The GGSN also may register to an IP Multicast group for this context if so configured.

The GGSN then returns a Create PDP Context Response (e.g. TEID, PDP Address, QoS Negotiated, Charging Id, Cause, unique id) message to the SGSN. PDP Address is included if the GGSN allocated a PDP address.

4) The SGSN sends a Create PDP Context Multipoint (e.g. unique id, QoS negotiated) to the RAN. The RAN registers the new Multipoint user and makes sure that the cell where the user is located gets the multipoint transmission.

5) The RAN answers the SGSN with a Create PDP Context Multipoint Response.

6) The SGSN sends an Activate PDP Context Accept (e.g. PDP Type=Multipoint, PDP Address, QoS Negotiated, unique id, decryption keys) message to the MS. At this point the MS can receive and possibly decode the Multipoint transmission.

Note: It should be possible to extend the now standardised Protocol Configuration Options (PCO) used for PDP Context Activation to transport e.g. unique id, ciphering and decryption keys.

According to the above embodiment, it is possible for several terminals to receive the same simultaneous transmission, whereby the IP address is not used to identify the receiving terminal. Hence, many simultaneous transmissions in both the CN and RAN will be avoided. The above solution is easy to integrate with the RAN, since it is handled on the application level.

Second Preferred Embodiment of the Invention

According to the second embodiment of the invention, a solution is described wherein multiple multipoint services are multiplexed or combined on the same given multipoint GTP tunnel between the GGSN and the SGSN and/or between the SGSN and the RAN. Thus, instead of using a dedicated GTP tunnel per multicast stream between the GGSN and the SGSN, this embodiment multiplexes multiple multicast streams on a common, possibly pre-configured, GTP tunnel.

According to the second embodiment, the GTP tunnels are used to transport the multicast data—i.e. a single copy for one or more clients on each interface—from the GGSN to the SGSN and from the SGSN to the RAN. In the following, these are called multipoint GTP tunnels.

The multiplexing involves that more IP streams are combined within the same GTP tunnel.

The GGSN multiplexes the multicast data onto the common GTP tunnel. The SGSN's de-multiplex the multicast data and perform the replication of the data for all group members for the corresponding multicast group. Similarly the RAN's de-multiplex and replicate the data in case the concept is extended to the Iu-interface. In that case the SGSN's will not do a replication to the group members but only to the RAN's with group members, unless pre-configured multipoint tunnels are used (see below).

According to the second embodiment, there are at least two alternatives—I and II—to multiplex different multicast data on a respective multipoint GTP tunnel from the GGSN to the SGSN:

I.

A respective MC tunnel from the GGSN to the respective SGSN is established having multicast content that matches the needs of the specific SGSN. The multicast tunnel is established whenever the particular SGSN has at least one MC group member. Multicast data relating to the specific plurality of multicast groups associated with a particular SGSN, is multiplexed (as long as the link bandwidth allows) on the same common GTP tunnel to the given SGSN. Specific tunnels, formed according to the same principles as above, are established for the remaining SGSN's having at least one MC group member. At reception in the GGSN of multicast data (recognised from the corresponding MC-group address in the IP destination header field) from an ISP, the GGSN checks in its multicast tables which SGSN and tunnel combinations should receive the multicast data and replicates and forwards the stream accordingly.

II.

Pre-configured MC tunnels from the GGSN to the respective SGSN's (i.e. either all or a subset of the SGSN's) are established on a default base. Multicast data relating to a plurality of multicast groups is multiplexed (as long as the link bandwidth allows) on the same common GTP tunnel to a given SGSN. Tunnels with identical contents are established to the other respective SGSN's. Note that it is not necessary to have exactly the same multicast streams multiplexed in each tunnel. E.g. tunnel 1 may multiplex stream 1 and 3, whereas tunnel 2 may multiplex stream 2, 3, and 4. The respective SGSN's discard multicast data for which they do not have any group members in their respective area. The GGSN will replicate the stream towards all SGSN's or to just a subset of all SGSN's in the network. A dedicated table (pre-configured) may be used for this purpose. The GGSN then replicates the data and sends it on the corresponding tunnels to the SGSN's. For this reason, the GGSN builds up tables that map the incoming multicast data stream to GTP tunnels. The GGSN may collect charging or statistical data from the multicast data received and replicated.

Multiple dedicated QoS tunnels can be created between a GGSN and a SGSN (and between an SGSN and RAN). The QoS of a mobile subscriber, as indicated during a PDP context activation procedure, is taken into account for the selection of the appropriate tunnel, as shall be shown in the following. Note that also other tunnel selection criteria, such as security, tariffs etc. may be taken into account.

For the two above alternatives, at reception of the multicast data in the SGSN, the SGSN has two options, III and IV, of processing the stream:

III.

In case multicast tunnels are applied on the Iu-PS interface, the SGSN performs a mapping of the tunnels from the Gn-interface to the Iu-PS interface. Note that this mechanism also applies when one of the interfaces (Gn or Iu-PS) supports multiplexing whereas the other interface ( ) does not support the multiplexing option. The mapping is also independent of whether the multiplex multicast tunnels are pre-configured or not.

Figure 2:
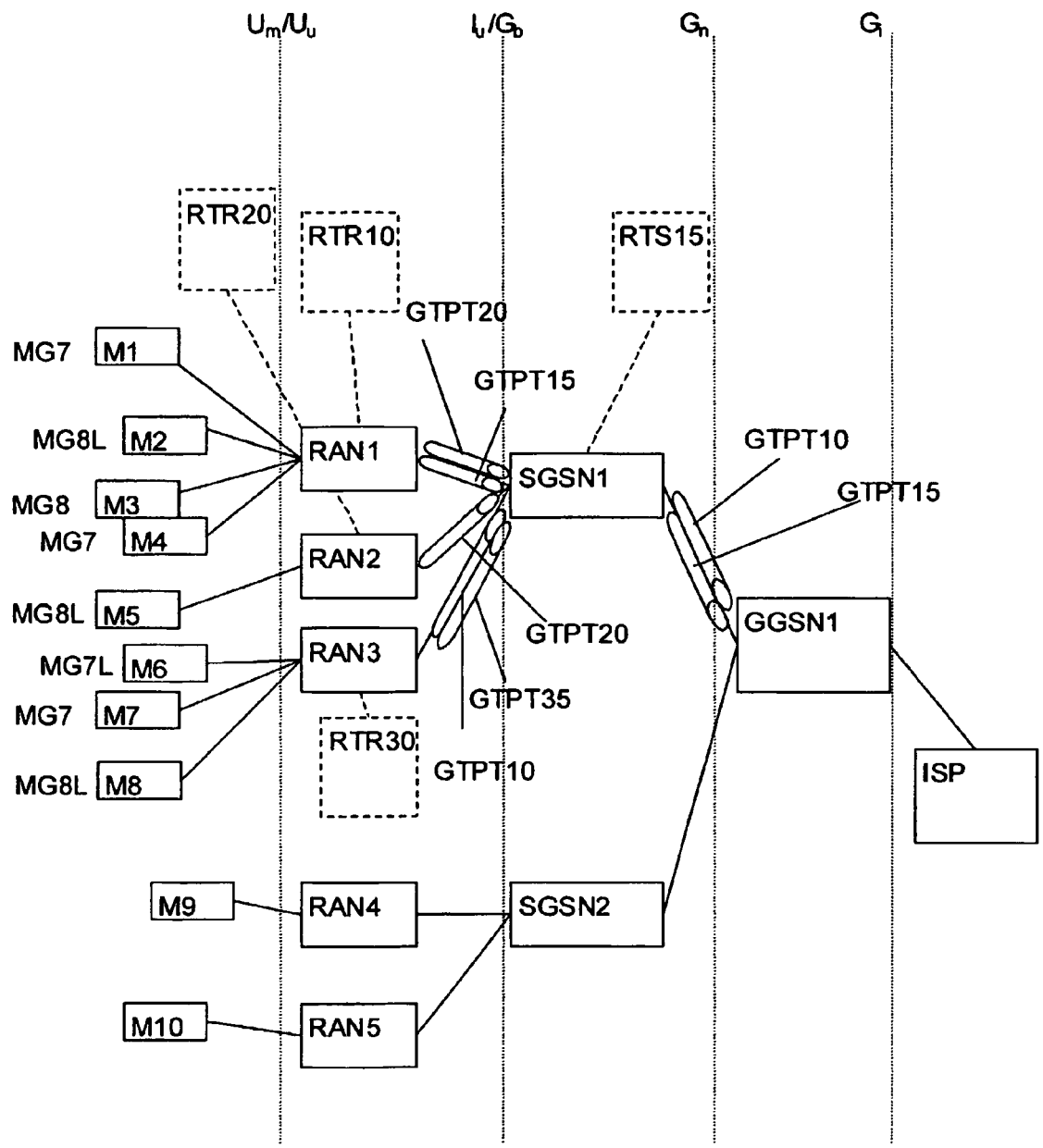
FIG. 2 shows an exemplary GPRS communication network according to a second embodiment of the invention.
Figure 4:
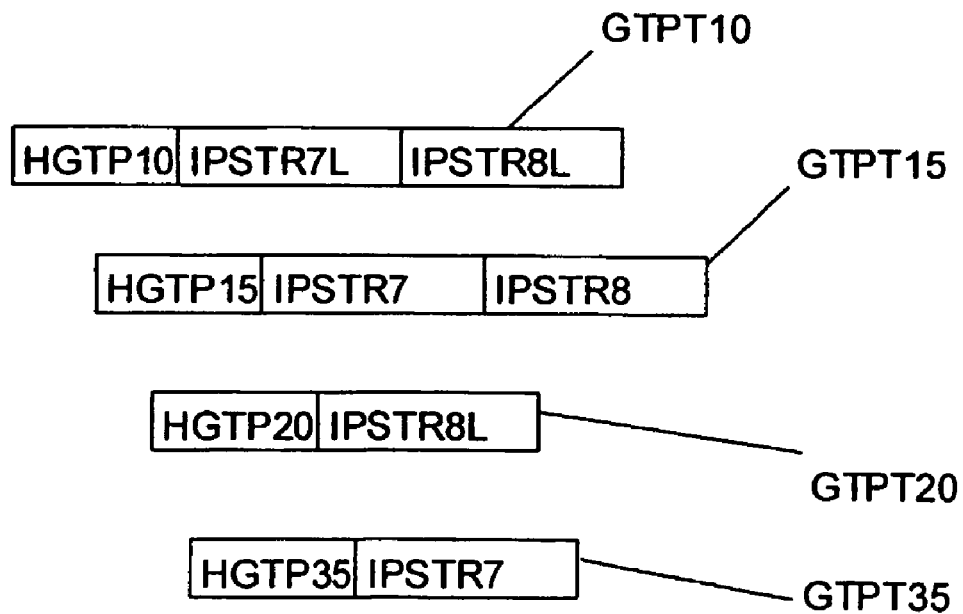
FIG. 4 shows exemplary GPRS tunnels according to the second embodiment of the invention relating to FIG. 2.

In FIGS. 2 and 4 an example has been shown relating to the same scenario of FIGS. 1 and 3 for the first embodiment.

As appears from FIGS. 2 and 4, a first low QoS tunnel GTP10 and high QoS tunnel GTPT15 are established between GGSN and SGSN1. Tunnel GTPT10 contains IP streams IPSTR7L and IPSTR8L multiplexed in one tunnel while tunnel GTPT15 comprises streams IPSTR7 and IPSTR8 multiplexed in another tunnel.

Figure 11:
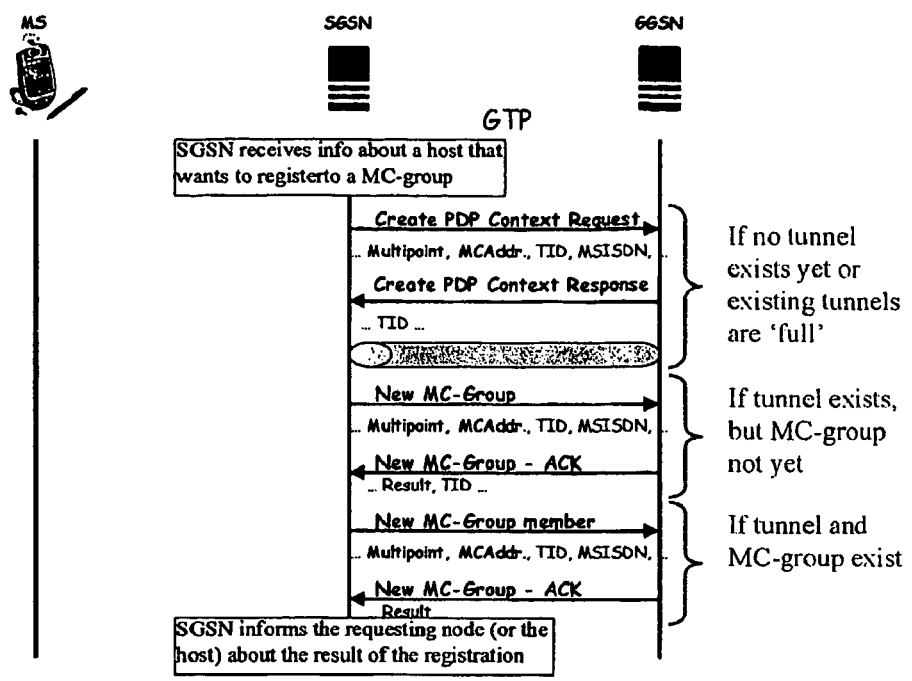

At reception in SGSN1, SGSN1 reads the content of the tunnelled packets and creates, by means of routing table RTR15 in FIG. 6 and routing tables RTR10, RTR20 and RTR30 of FIGS. 7, 8 and 9, two new tunnels, namely GTP20 and GTP35 (Note that these tunnels can already be created as shown in the FIG. 11). Tunnel GTP20 corresponds to GTP10 with the exception that the non-demanded stream IPSTR7L of RAN2 is discarded. Tunnel GTP35 corresponds to GTP15 with the exception that the non-demanded stream IPSTR8 of RAN3 is discarded. Tunnels GTP10 and GTPT15 are re-used and re-directed to RAN3 and RAN1, respectively, because RAN1 and RAN3 need all the content of the respective tunnels. It should be understood that in typical scenarios, a large plurality of mobile stations would be available whereby many mobile stations would receive the same multicast stream and the multicast tunnels would contain several (for instance 3-10 or even-100) multicast streams for each QoS level.

IV.

In case no multicast tunnels are applied on the Iu-PS interface, the SGSN checks in its multicast tables which group members should receive the multicast data, possibly with the corresponding QoS. The SGSN then replicates the data and forwards it to the corresponding group members (possibly in different RAN's). In case multiplexed multicasting is used on the Iu-PS interface, no or less replication may be required (depending on the number of RAN's that should receive the multicast stream). In addition, the SGSN may collect charging or statistical data from the multicast data received and replicated or propagated.

Note that although the mechanism here is described for the Gn and Gp (For the Gb interface no multicasting can be done, implying that the SGSN must always replicate the stream to the individual users) interfaces, it may apply to any part of the network where tunnelling is applied (e.g. Iu-PS between the RAN and SGSN). The solution can even be used for other tunnelling solutions such as the Layer 2 Tunnelling Protocol (L2TP). The latter also applies to the first embodiment.

Multiplexed Multicast Tunnel Establishment

As illustrated in FIG. 11, at reception of information from the Ue (via the radio network) or from the GGSN that a host would like to be registered to a multicast group (i.e. become a group member) the SGSN checks whether it already has a multipoint GTP tunnel towards the same GGSN. The SGSN also checks whether there is a multiplexed tunnel with the corresponding QoS, and if yes, whether the multicast stream is already part of that multiplexed tunnel.

If no multicast tunnel exists between the SGSN and the GGSN, the SGSN initiates the process for creating a multipoint tunnel.

Both the MC-group address and the host-id (MSISDN) are sent to the GGSN.

The tunnels may already exist in case pre-configured multiplexed tunnels are used.

If a tunnel exists, but not yet for this multicast group, a new message is sent to the GGSN in order to make the GGSN aware of the existence of the multicast group.

Both the MC-group address and the host-id (MSISDN), but also the TID are sent to the GGSN. An additional indicator to denote that the MC-group is not yet part of the tunnel can be used. However, this may also be determined by the GGSN from the corresponding data storage.

If a tunnel exists and the GGSN is already informed about this specific multicast group, the SGSN optionally informs the GGSN with a new message that there is an additional multicast group member. The GGSN may use this information for statistical or charging purposes.

Both the MC-group address and the host-id (MSISDN), but also the TID are sent to the GGSN. An additional indicator to denote that the MC-group is already part of the tunnel can be used. However, this may also be determined by the GGSN from the corresponding data storage.

Instead of the SGSN sending the host-id in all three cases above, the host-id may be omitted and the GGSN just stores counters with the number of members per MC-group per SGSN. FIG. 11 shows an exemplary signalling diagram for the establishment. Other signalling messages and/or parameters may be used instead or in addition.

The SGSN stores the MC-groups per TID (note that this is not absolutely necessary since the MC-group data will anyway arrive at the SGSN) and the MSISDNs per MC-group. The GGSN stores the MC-groups per TID and optionally the number of members per MC-group per SGSN or the actual host-ids of the members per MC-group per SGSN. Both the SGSN and GGSN store additional characteristics, such as the QoS, per MC-group and tunnel, if that is applicable. In the GGSN multiple tunnels to the same SGSN for the same MC-group, but with different QoS characteristics, may exist.

Multiplexed Multicast Tunnel Release

Figure 12:
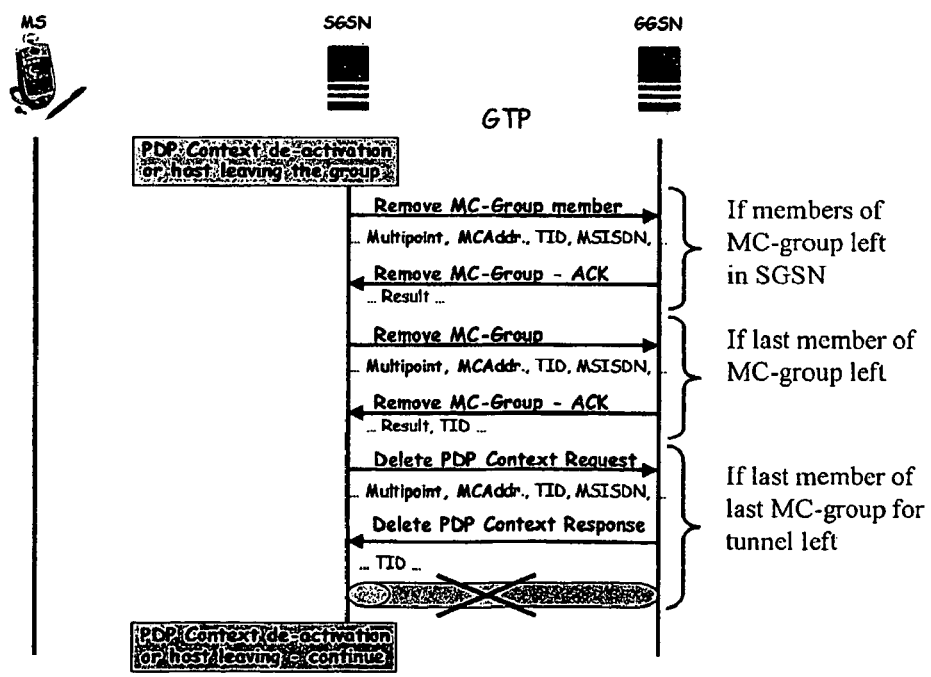

In FIG. 12, the procedure for releasing the multiplexed multicast tunnel has been illustrated.

When the multipoint PDP-context is deactivated (see e.g. 3GPP TS 23.060), or the host leaves the multicast group (e.g. IGMP leave message), the SGSN checks whether this was the last member of a MC-group or even the last member of the last MC-group in a multiplexed tunnel.

If other members exist for this MC-group, the SGSN informs the GGSN that one member has de-registered from the MC-group. Depending on the data stored in the GGSN, the SGSN sends either the host-id or just a message that the counter for the MC-group is to be decreased.

If no more members exist for this MC-group but other MC-groups use the tunnel, the SGSN informs the GGSN that the last member of the MC-group has de-registered and that no more members for the MC-group exist in that SGSN. Note that the GGSN may also determine this itself, since the corresponding counter in the GGSN will be set to zero.

If no more members for any MC-group exist for the tunnel, the SGSN releases the tunnel towards the GGSN. Note that the tunnel may remain for future use if pre-configured multiplexed tunnels are used. Optionally, timers may be used to release tunnels after a certain period of inactivity.

FIG. 12 shows an exemplary signalling diagram for the release. Other signalling messages and/or parameters may be used instead or in addition.

In case tunnels are based on QoS or other characteristics, these considerations are taken into account in the selection procedures are shown and described above. E.g. instead of selecting one of the tunnels for a new MC-group, a tunnel with the appropriate QoS characteristics is selected or created if it does not exist yet.

ADVANTAGES OF THE INVENTION

This invention provides an efficient utilisation of scarce and expensive network resources in wireless networks.

Efficient transmission on the Gn and Gp and Iu-PS interface is achieved by transmitting only a single copy of a packet on each link. This reduces the overall transmission resources needed (and limits the need for congestion prevention, load balancing algorithms, etc.) when multiple clients for the same multicast group are located in the same or different SGSN's. Note that this also applies to scenarios with heterogeneous subscriber equipment or access networks, since layering (e.g. multiple media or multiple adaptation layers as specified in MPEG-4) of the information can be used as described in the background chapter.

Furthermore, according to the second embodiment of the invention using (pre-configured) multiplexed multicast tunnels reduces the tunnel establishment signalling between the SGSN and GGSN, which affects the session set-up times in a positive way. The set-up time is not only reduced when clients register or de-register for MC-groups but also when they change the corresponding serving SGSN (in case of handover). Furthermore, by using QoS-based multiplexed tunnels according to another aspect of the second embodiment, an enhanced service provisioning and multiplexing of different multicast groups on the same tunnel is achieved.

Pre-configured tunnels decrease the complexity of multicast support in a 3G network and can be seen as the first evolution step towards large-scale multicast support in mobile networks.

Another benefit is the load reduction on the content provider (e.g. streaming server) since the content only needs to be sent once for a whole multicast group.

The multipoint transmission according to the invention is especially advantageous for the air interface of mobile systems, especially in situations where resources are limited, such as when hundreds of users, present in the same mobile communication cell, are receiving the same transmission.

There are many possible applications for mobile multicast sessions. To name a few: Transmission to spectators at a football arena with replays of the latest goal is one example. Traffic information or commercials (e.g. streaming video) within a certain geographical area are among the numerous other applications, which would be interesting to access wirelessly.

TERMINOLOGY AND ABBREVIATIONS

APN Access Point Name
CN Core Network
GGSN Gateway GPRS Support Node
GPRS General Packet Radio Service
GPRS General Packet Radio Service
GTP GPRS Tunnelling Protocol
HLR Home Location Register
IGMP Internet Group Management Protocol
L2TP Layer 2 Tunnelling Protocol
MC Multicast
MLD Multicast Listener Discovery
MS Mobile Station
PDP Packet Data Protocol
PLMN Public Land Mobile Network
QoS Quality of Service
RAN Radio Access Network
RFC Request For Comments
RTSP Real-time Streaming Protocol
SGSN Serving GPRS Support Node
SIP Session Initiation Protocol
TE Terminal Equipment
TEID Tunnel End Point Id
TID Tunnel Identifier
UC Unicast
UMTS Universal Mobile Telecommunications System
WAP Wireless Application Protocol

The invention claimed is:

1. A packet radio data network comprising
a gateway node (GGSN) comprising routing functionality for tunnelling IP streams (packet data units) (PDU) to a mobile station via a given point of attachment of the mobile station to a radio access node (RAN),
at least one serving node (SGSN) connected to the gateway node, for engaging in PDP context activation procedures which enable a given mobile station to perform packet switched communication with the external packet data network and enable charging of such communication, a plurality of radio access nodes (RAN), to which mobile stations are wirelessly connected to the serving node (SGSN), for transporting packet data from an external packet data network, the external packet data network comprising an Internet Service Provider (ISP), whereby at least the gateway node, subsequent to a PDP multipoint context activation procedure, establishes at least a first multicast tunnel between the gateway node and the at least one serving node, the first multicast tunnel carrying IP streams pertaining to at least two mobile stations belonging to a common multicast group;

the at least one serving node comprising mobility management and security functions for the mobile stations, and the first multicast tunnel comprising combined IP streams pertaining to a plurality of multicast groups.

2. The packet data network according to claim 1, wherein at least a second multicast tunnel comprising multicast data pertaining to at least one multicast group is established between one of the at least one serving nodes and one of the plurality of radio access nodes.

3. The packet data network according to claim 2, wherein the content of the first multicast tunnel is identical to the content of the second multicast tunnel.

4. The packet data network according to claim 3, wherein the first and second multicast tunnels comprise IP streams from a single multicast group.

5. The packet data network according to claim 4, wherein a third multicast tunnel with identical IP stream content to the second multicast tunnel is established, the second and the third multicast tunnels being directed to various ones of the plurality of radio access nodes (RAN) which demand the content.

6. The packet data network according to claim 1, wherein either the IP content of the first multicast tunnel is transferred to the second multicast tunnel, such that the first and second multicast tunnels carry identical IP stream content or the content of individual IP streams not demanded at a given radio access node (RAN) is discarded from the IP stream content of the first multicast tunnel at entry into the serving node, such that the second multicast tunnel carries only a sub-set of the IP stream content of the first multicast tunnel.

7. The packet data network according to claim 6, wherein the first and second multicast tunnels carry IP streams of the same class of quality of service.

8. A method of establishing a multicast tunnel in a packet radio data network to mobile stations (MS) wirelessly attached to radio access nodes (RAN), wherein the packet radio network is transporting packet data from an external packet data network, the method comprising the steps of:

a gateway node tunneling IP streams (packet data units) (PDU) to a mobile station via a point of attachment of the mobile station to a radio access node utilizing a routing functionality in the gateway node;

a serving node activating PDP procedures which enable a given mobile station to perform packet switched communication with the external packet data network and enable charging of such communication, wherein the serving node comprises mobility management and security functions for the mobile stations;

the gateway node combining IP streams pertaining to a plurality of multicast groups in the same tunnel towards the serving node, and responsive to receiving information that a mobile station desires to register to a multicast group and no tunnel currently exists or existing tunnels are full, the serving node creating a PDP context request of multipoint type, the gateway node responding with a PDP context response setting up a multicast tunnel between the gateway node and the serving node.

9. The method according to claim 8, further comprising the gateway node acknowledging to the serving node the inclusion of IP stream content of the desired multicast group in the existing tunnel if a tunnel exists, which is not full, and the tunnel does not comprise IP stream content pertaining to the requested multicast group.

10. The method according to claim 9, further comprising the gateway node acknowledging to the serving node the new multicast group member in the existing tunnel if both a tunnel exists which is not full and the IP stream content, corresponding to the desired multicast group, already exists in the tunnel.

11. A method of establishing a multicast tunnel in a packet radio data network transporting packet data from an external packet data network to mobile stations (MS) wirelessly attached to radio access nodes (RAN) the method comprising:

tunnelling IP streams (packet data units) (PDU) to a mobile station via the given point of attachment of the mobile station to a radio access node (RAN) utilizing a gateway node (GGSN) that comprises routing functionality in the packet radio data network, utilizing a serving node for engaging in PDP context activation procedures, which enable a given mobile station to perform packet switched communication with the external packet data network and enable charging of such communication, wherein the serving node comprises mobility management and security functions for the mobile stations, the gateway node establishing a tunnel to the serving node carrying IP streams relating to a given multicast group, the serving node establishing a tunnel to at least one radio access node (RAN) carrying identical IP streams relating to the same multicast group, the serving node validating a received multipoint PDP context request from a mobile station; and determining whether the requested PDP context request is not already activated by another mobile station, and if the PDP context request is not active, the serving node issuing a create PDP context request to the gateway node.

12. The method according to claim 11, wherein the gateway node upon receiving the create PDP context request, creates a new entry in its PDP context table, and if the PDP context is not already activated in the gateway node, enabling the multicast tunnel to be established between the gateway node and the serving node.

13. The method according to claim 12, wherein after the gateway node has created the new entry in its PDP table the gateway returns a PDP context response to the serving node, whereupon the serving node sends a create PDP context multipoint to the radio access node to which the mobile station in question is attached.

14. The method according to claim 13, wherein the radio access node answers the serving node with a create PDP context multipoint response thereby enabling a tunnel to be established between the serving node and the radio access node, the tunnel carrying identical content as the tunnel established between the gateway node and the serving node.

* * * * *

UNITED STATES PATENT AND TRADEMARK OFFICE
CERTIFICATE OF CORRECTION

| | | |
|---|---|---|
| PATENT NO. | : 7,680,109 B2 | Page 1 of 1 |
| APPLICATION NO. | : 10/487128 | |
| DATED | : March 16, 2010 | |
| INVENTOR(S) | : Lundin et al. | |

It is certified that error appears in the above-identified patent and that said Letters Patent is hereby corrected as shown below:

On the Title Page, in Item (75), under "Inventors", in Column 1, Line 3, delete "Tobjorn" and insert -- Torbjorn --, therefor.

On the Title Page, in Item (30), under "Foreign Application Prionty Data", in Column 1, Line 2, delete "(SE)" and insert -- (EP) --, therefor.

In Column 3, Line 22, delete "FIG." and insert -- FIGS. --, therefor.

In Column 5, Line 34, delete "network:" and insert -- network. --, therefor.

Signed and Sealed this

Ninth Day of November, 2010

David J. Kappos
*Director of the United States Patent and Trademark Office*